(12) United States Patent
    Son et al.

(10) Patent No.: US 11,886,887 B2
(45) Date of Patent: Jan. 30, 2024

(54) MANAGEMENT METHOD AND DEVICE FOR UPDATING UNDERLYING MULTI-LEVEL FIRMWARE PROGRAMS USING VERIFYING CONTROLLERS

(71) Applicant: Samsung Electronics Co., Ltd, Suwon-si (KR)

(72) Inventors: Sunghoon Son, Suwon-si (KR); Hyung-Dal Kwon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/316,893

(22) Filed: May 11, 2021

(65) Prior Publication Data

US 2022/0075629 A1    Mar. 10, 2022

(30) Foreign Application Priority Data

Sep. 9, 2020  (KR) .................. 10-2020-0115562

(51) Int. Cl.
    *G06F 9/4401*   (2018.01)
    *G06F 13/28*    (2006.01)
    *G06F 8/71*     (2018.01)
    *G06F 8/654*    (2018.01)

(52) U.S. Cl.
    CPC ............ *G06F 9/4416* (2013.01); *G06F 8/654* (2018.02); *G06F 8/71* (2013.01); *G06F 9/4418* (2013.01); *G06F 13/28* (2013.01)

(58) Field of Classification Search
    CPC .......... G06F 9/4416; G06F 8/654; G06F 8/71; G06F 9/4418; G06F 13/28
    See application file for complete search history.

(56) References Cited

U.S. PATENT DOCUMENTS

| | | | |
|---|---|---|---|
| 6,513,114 B1* | 1/2003 | Wu | G06F 9/4411 713/2 |
| 6,941,453 B2 | 9/2005 | Rao | |
| 7,219,343 B2 | 5/2007 | Almeida et al. | |
| 7,644,406 B2 | 1/2010 | Gustafson et al. | |
| 10,127,032 B2 | 11/2018 | Su | |
| 11,561,785 B2* | 1/2023 | Kim | G06F 9/4401 |

(Continued)

FOREIGN PATENT DOCUMENTS

| | | |
|---|---|---|
| KR | 10-0862971 B1 | 10/2008 |
| KR | 10-2011-0104383 A | 9/2011 |
| KR | 10-1466560 B1 | 11/2014 |

(Continued)

*Primary Examiner* — Tammara R Peyton
(74) *Attorney, Agent, or Firm* — NSIP Law

(57) ABSTRACT

An operating method of an electronic device including controllers includes updating, by a first-level controller of the controllers, a first-level firmware of the the first-level controller, writing, by the first-level controller, a second-level firmware to one of second-level controllers of the controllers having a lower level than the first-level controller, booting, by the one of the second-level controllers, by performing a reset operation, verifying, by the first-level controller or the booted second-level controller, whether there is a target second-level controller with out-of-date firmware, and writing, by the first-level controller or the booted second-level controller in response to a result of the verifying, the second-level firmware to the target second-level controller.

20 Claims, 14 Drawing Sheets

(56) References Cited

U.S. PATENT DOCUMENTS

2016/0062698 A1* 3/2016 Wu .................. G06F 3/0658
                                                    714/6.2
2017/0131991 A1   5/2017 Su

FOREIGN PATENT DOCUMENTS

| KR | 10-2016-0050707 A | 5/2016 |
| KR | 10-1992680 B1 | 6/2019 |
| KR | 10-2048111 B1 | 12/2019 |

\* cited by examiner

MANAGEMENT METHOD AND DEVICE FOR UPDATING UNDERLYING MULTI-LEVEL FIRMWARE PROGRAMS USING VERIFYING CONTROLLERS

CROSS-REFERENCE TO RELATED APPLICATIONS

This application claims the benefit under 35 USC § 119(a) of Korean Patent Application No. 10-2020-0115562 filed on Sep. 9, 2020, in the Korean Intellectual Property Office, the entire disclosure of which is incorporated herein by reference for all purposes.

BACKGROUND

1. Field

The following description relates to firmware management in an electronic device.

2. Description of Related Art

Firmware is a kind of software that may provide basic control and drive for a system. In general, firmware may be written to a read-only memory (ROM).

In the past, a firmware update was performed for many systems in a network environment. One related prior art is U.S. Pat. No. 7,219,343 B2 (Title of Invention: Firmware update mechanism in a multi-node data processing system, Applicant: International Business Machines Corporation). The content of this US patent publication is to update firmware uniformly across multiple network nodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operating method of an electronic device including controllers includes updating, by a first-level controller of the controllers, a first-level firmware of the the first-level controller, writing, by the first-level controller, a second-level firmware to one of second-level controllers of the controllers having a lower level than the first-level controller, booting, by the one of the second-level controllers, by performing a reset operation, verifying, by the first-level controller or the booted second-level controller, whether there is a target second-level controller with out-of-date firmware, and writing, by the first-level controller or the booted second-level controller in response to a result of the verifying, the second-level firmware to the target second-level controller.

The writing of, by the first-level controller, the second-level firmware to the one of the second-level controllers may include writing, by the first-level controller, the second-level firmware stored in an external memory to the one of the second-level controllers.

The operating method may further include verifying, by the booted second-level controller, whether there is a target third-level controller with out-of-date firmware among third-level controllers of the controllers having a lower level than the second-level controllers, requesting, by the booted second-level controller in response to there being the target third-level controller with out-of-date firmware, third-level firmware from the first-level controller, and receiving, by the booted second-level controller, the third-level firmware from the first-level controller and writing the third-level firmware to the target third-level controller.

The operating method may further include verifying, by the booted second-level controller, whether there is a target third-level controller with out-of-date firmware among third-level controllers of the controllers having a lower level than the second-level controllers, and writing, by the booted second-level controller in response to there being a target third-level controller with out-of-date firmware, third-level firmware stored in an external memory to the target third-level controller.

The operating method may further include controlling, by the target second-level controller while being booted after the second-level firmware is written thereto, a direct memory access (DMA) controller to perform a firmware update for a same-level or lower-level controller with out-of-date firmware.

The operating method may further include requesting, by the first-level controller in response to being booted by updating the first-level firmware, the second-level firmware from a host, and receiving, by the first-level controller, the second-level firmware from the host and storing the second-level firmware in a memory.

The operating method may further include determining, by the first-level controller or the booted second-level controller in response to failing to write the second-level firmware to the target second-level controller or unacknowledged completion of booting of the target second-level controller after the writing to the target second-level controller, that the target second-level controller is abnormal.

The operating method may further include determining, by the first-level controller in response to acknowledged completion of booting of the target second-level controller unwritten to a controller status table within a predetermined time, that the target second-level controller is abnormal.

The writing of, by the first-level controller, the second-level firmware to the one of the second-level controllers may include writing, by the first-level controller, the second-level firmware to the second-level controllers in a broadcasting-based manner. The operating method may further include writing, by the booted second-level controller, a third-level firmware to third-level controllers of the controllers connected to the booted second-level controller in the broadcasting-based manner.

The operating method may further include allocating, by the first-level controller, a memory address to each of the second-level controllers.

In another general aspect, an electronic device include controllers including a first-level controller configured to update a first-level firmware, and write a second-level firmware to one of second-level controllers having a lower level than the first-level controller. The one of the second-level controllers is configured to boot by performing a reset operation. The first-level controller or the booted second-level controller is configured to verify whether there is a target second-level controller with out-of-date firmware. The first-level controller or the booted second-level controller is configured to write, in response to there being the target second-level controller with out-of-date firmware, the second-level firmware to the target second-level controller.

The booted second-level controller may be configured to verify whether there is a target third-level controller with out-of-date firmware among third-level controllers of the controllers having a lower level than the second-level controllers, request, in response to there being a target third-level controller with out-of-date firmware, a third-level firmware from the first-level controller, and receive the third-level firmware from the first-level controller and write the third-level firmware to the target third-level controller.

The booted second-level controller may be configured to verify whether there is a target third-level controller with out-of-date firmware among third-level controllers of the controllers having a lower level than the second-level controllers, and write, in response to there being a target third-level controller with out-of-date firmware, a third-level firmware stored in a memory to the target third-level controller.

The target second-level controller may be configured to control, while being booted after the second-level firmware is written thereto, a direct memory access (DMA) controller to perform a firmware update for a same-level or lower-level controller with out-of-date firmware.

The first-level controller or the booted second-level controller may be configured to determine, in response to failing to write the second-level firmware to the target second-level controller or unacknowledged completion of booting of the target second-level controller after the writing to the target second-level controller, that the target second-level controller is abnormal, or determine, in response to acknowledged completion of booting of the target second-level controller unwritten to a controller status table within a predetermined time, that the target second-level controller is abnormal.

The first-level controller may be further configured to write the second-level firmware to the second-level controllers in a broadcasting-based manner. The booted second-level controller may be configured to write a third-level firmware to third-level controllers of the controllers connected to the booted second-level controller in the broadcasting-based manner. The third-level controllers may have a lower level than the booted second-level controller, and the third-level firmware is of the third-level controllers.

In another general aspect, a network system includes electronic devices and a host configured to communicate with the electronic devices. The electronic devices includes a first electronic device configured to receive firmware from the host and perform a firmware update. Each of the first electronic device and the host is configured to perform a firmware update by writing the firmware respectively to other electronic devices with out-of-date firmware. Each of the first electronic device, the firmware-updated electronic devices, and the host is configured to perform a firmware update by writing the firmware respectively to other electronic devices with out-of-date firmware.

The host may be configured to store a device status table comprising firmware update status for each of the electronic devices.

The electronic devices may form a network topology.

The network topology may include a tree structure, a tree-ring structure, a mesh structure, a torus structure, a ring structure, a star structure, or a ring-star structure.

Other features and aspects will be apparent from the following detailed description, the drawings, and the claims.

Figure 1:
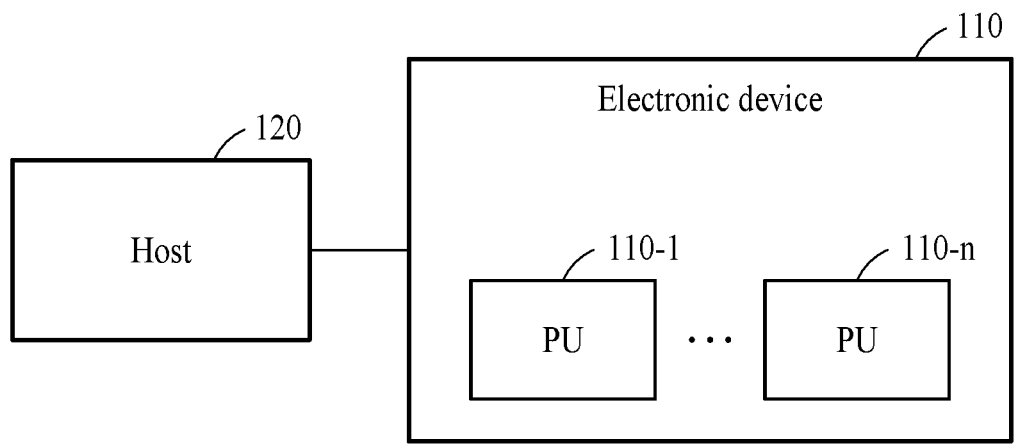
FIGS. 1 to 3 illustrate an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
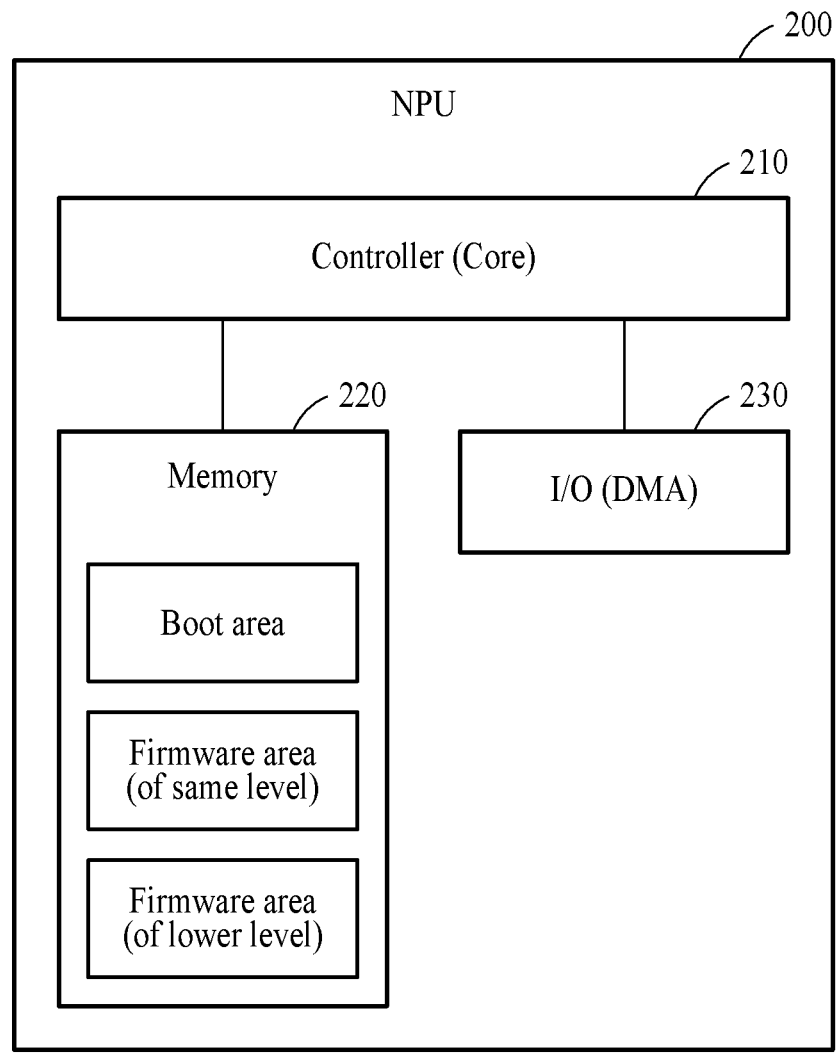
Figure 3:
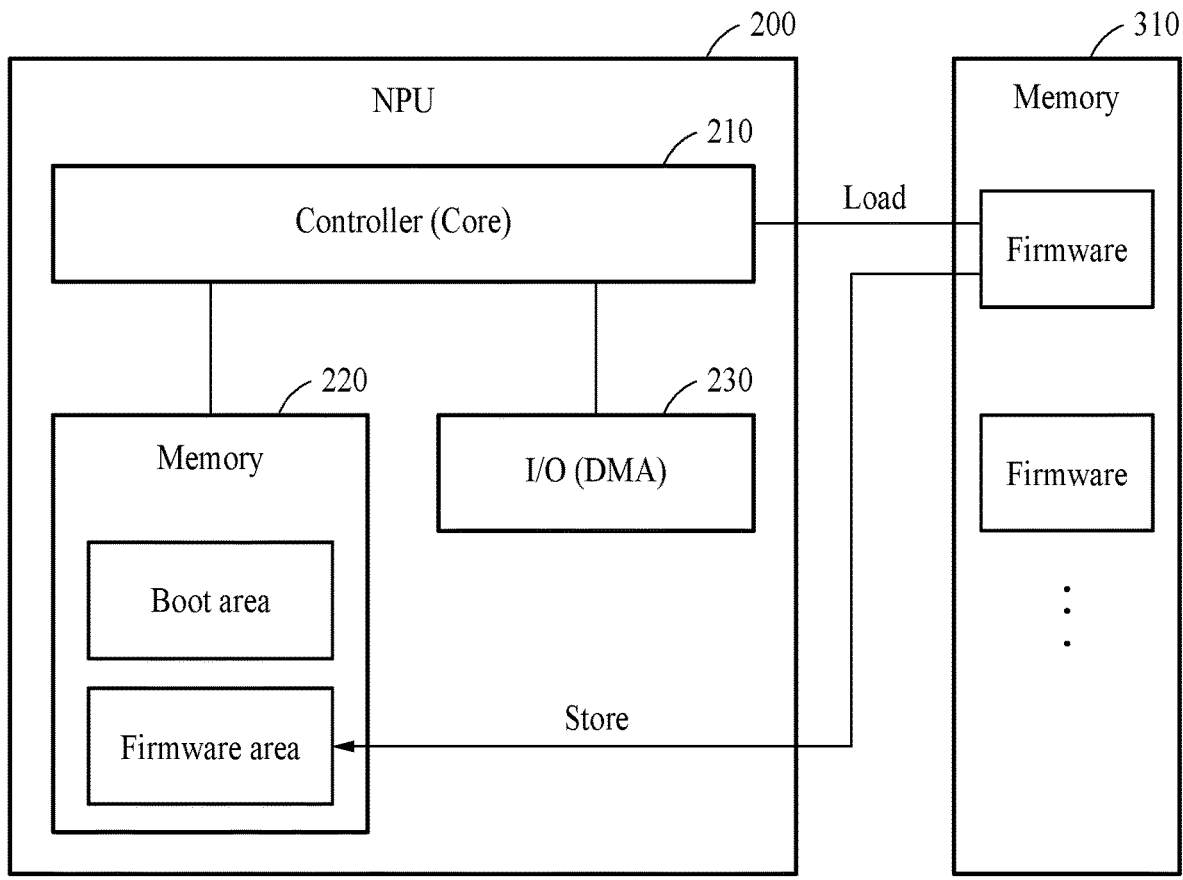

FIGS. 1 to 3 illustrate an example of an electronic device.

In FIG. 1, an electronic device 110 communicates with a host 120.

The electronic device 110 may be included in, or be, an electronic device such as a smartphone or a tablet, or a terminal such as a server or a computer. However, examples are not limited thereto.

The electronic device 110 may include a plurality of processing units (PUs) 110-1 to 110-n. Each of the PUs 110-1 to 110-n may include a controller (or core). In other words, the electronic device 110 may include a plurality of controllers.

Each of the controllers in the electronic device 110 may be assigned a level. For example, the controllers in the electronic device 110 may be classified into a level-1 controller corresponding to the highest level, level-2 controllers having a lower level than the level-1 controller, level-3 controllers having a lower level than the level-2 controllers, and the like.

Each of the controllers in the electronic device 110 may perform a firmware update. As an example, an upper-level controller may perform a firmware update for a same-level controller or a lower-level controller. This firmware update may be referred to as a diffusion-based firmware update. This will be further described with reference to FIGS. 4 to 7. As another example, an upper-level controller may perform a firmware update for lower-level controllers connected to the upper-level controller. This firmware update may be referred to as a broadcasting-based firmware update. This will be further described with reference to FIG. 8.

The controllers in the electronic device 110 may perform a diffusion-based firmware update or a broadcasting-based firmware update, thereby improving the firmware update rate for all the controllers in the electronic device 110. In addition, the electronic device 110 may reduce the number of communications with the host 120 for a firmware update, thereby reducing the burden on the host 120.

Each of the PUs 110-1 to 110-n may correspond to, for example, a neural processing unit (NPU). An example of an NPU is shown in FIGS. 2 and 3. In the example shown in FIGS. 2 and 3, an NPU 200 includes a controller 210, a memory 220, and an input/output (direct memory access (DMA)) 230. In response to receiving a command from the controller 210, the input/output (DMA) 230 may access an external memory to input or output data.

FIG. 2 shows an example in which there is a free space in the memory 220, and FIG. 3 shows an example in which the memory 220 has insufficient space.

In FIG. 2, the memory 220 may include a boot area, a firmware area (of the same level), and a firmware area (of a lower level). Firmware of a controller of the same level as the controller 210 may be stored in the firmware area (of the same level), and firmware of a controller of a lower level than the controller 210 may be stored in the firmware area (of a lower level). In FIG. 2, the controller 210 may perform a firmware update for a controller of the same level as the controller 210 by transmitting or writing the firmware stored in the firmware area (of the same level) to the controller of the same level. Further, the controller 210 may perform a firmware update for the controller of the same level by transmitting or writing the firmware stored in the firmware area (of a lower level) to a controller of a lower level.

In FIG. 3, firmware corresponding to each level may be stored in a memory 310. For example, firmware of a level-0 controller, firmware of level-1 controllers, firmware of level-2 controllers, and the like may be stored in the memory 310. Several controllers may access the memory 310. The memory 310 is located inside the electronic device 110 but outside the NPU 200 and thus, may be referred to as an external memory. The memory 310 is a non-volatile memory, and may be, for example, a high bandwidth memory (HBM). However, examples are not limited thereto. In FIG. 3, the controller 210 may load firmware of a controller requiring a firmware update from the memory 310 and store the firmware in the memory 220. Here, the controller requiring a firmware update may be a controller of the same level as the controller 210 or a controller of a lower level than the controller 210. The controller 210 may transmit or write the firmware to the controller requiring a firmware update.

FIGS. 4 to 7 illustrate an example of a diffusion-based firmware update in an electronic device.

In a conventional case, only the highest-level controller in a device, including multi-level controllers, may have a read-only memory (ROM). In this case, to operate the lower-level controllers, the highest-level controller individually writes firmware to a read-access memory (RAM) of each of the lower-level controllers, or a host writes firmware to the RAM of each of the lower-level controllers. Accordingly, it takes much time until the firmware update for all the controllers is complete. The diffusion-based firmware update, which will be described later, may reduce the time required until the firmware update for all the controllers is complete. In other words, the diffusion-based firmware update may update the firmware of all the controllers more quickly. Hereinafter, the diffusion-based firmware update will be further described.

Figure 4:
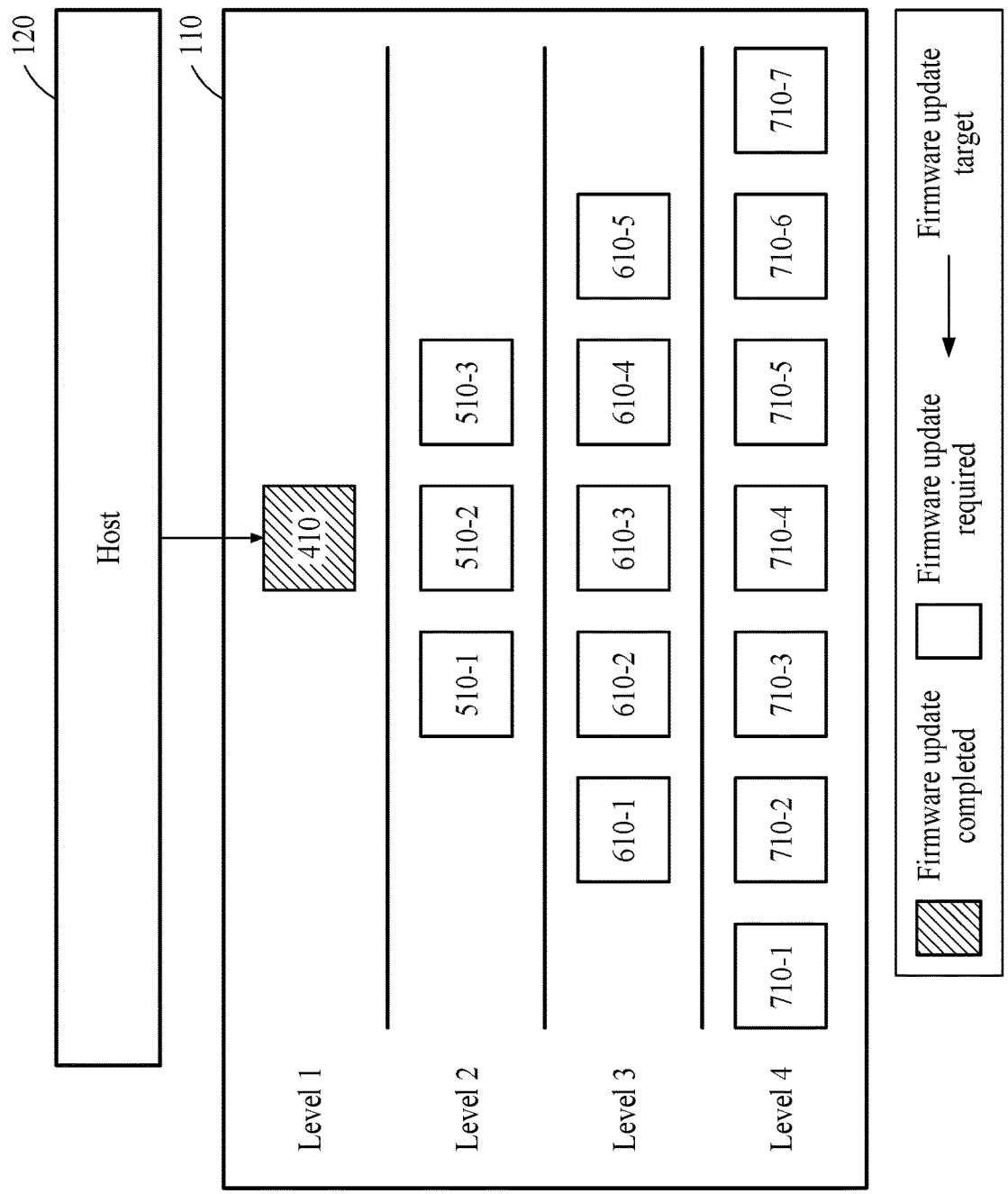
FIGS. 4 to 7 illustrate an example of a diffusion-based firmware update in an electronic device.
Figure 5:
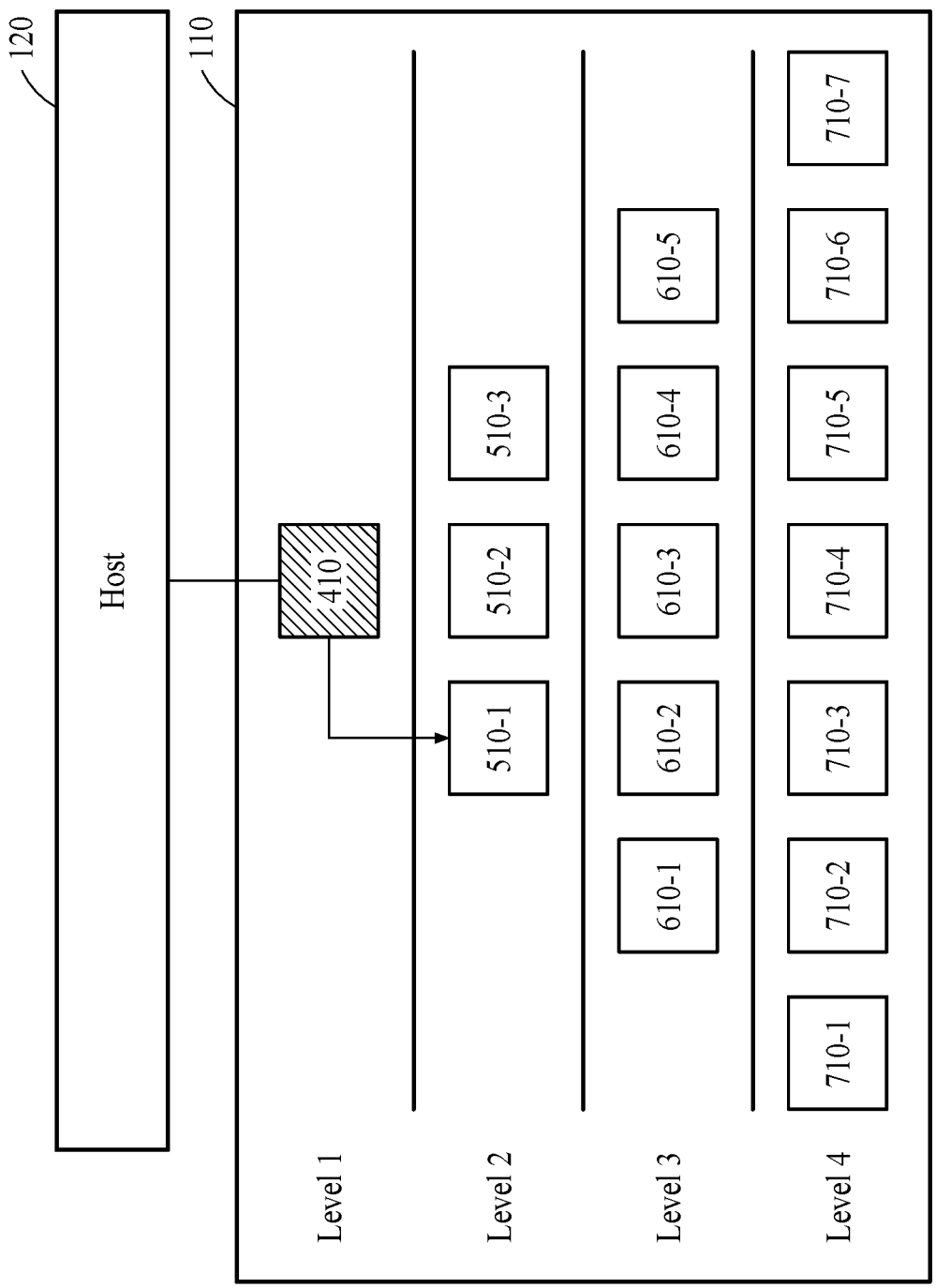

In FIG. 4, blocks 410, 510-1 to 510-3, 610-1 to 610-5, and 710-1 to 710-7 are shown. Each of the blocks 410, 510-1 to 510-3, 610-1 to 610-5, and 710-1 to 710-7 may correspond to the PU described in FIG. 1 or the NPU 200 described in FIG. 2 or 3. Alternatively, each of the blocks 410, 510-1 to 510-3, 610-1 to 610-5, and 710-1 to 710-7 may correspond to the controller 210 described in FIG. 2 or 3.

For ease of description, it is assumed that each of the blocks 410, 510-1 to 510-3, 610-1 to 610-5, and 710-1 to 710-7 corresponds to the controller 210. In this example, the block 410 may be a level-1 controller, the blocks 510-1 to 510-3 may be level-2 controllers having a lower level than the level-1 controller, the blocks 610-1 to 610-5 may be level-3 controllers having a lower level than the level-2 controllers, and the blocks 710-1 to 710-7 may be level-4 controllers having a lower level than the level-3 controllers.

The level-1 controller 410 may update its own firmware. For example, the level-1 controller 410 may request its own firmware (hereinafter, the firmware of the level-1 controller 410 will be referred to as level-1 firmware) from the host 120, receive the level-1 firmware from the host 120, and store the level-1 firmware in a memory (for example, the memory 310 or the RAM of the level-1 controller 410). According to an implementation, the electronic device 110 may not have a ROM. In this example, the level-1 firmware may be updated by the host 120.

The level-1 controller 410 may boot by performing a reset operation.

When the level-1 controller 410 completes booting, the completion of booting of the level-1 controller 410 or the completion of the firmware update of the level-1 controller 410 may be recorded in a controller status table. The controller status table may be stored in at least one of the level-1 controller 410 and the memory 310. According to an implementation, the controller status table may be stored in the host 120.

When the level-1 controller 410 completes booting, the level-1 controller 410 may request the firmware of the lower-level controllers from the host 120. For example, the level-1 controller 410 may request firmware of the level-2 controllers 510-1 to 510-3 (hereinafter, referred to as level-2 firmware), the firmware of the level-3 controllers 610-1 to 610-5 (hereinafter, referred to as level-3 firmware), and the firmware of the level-4 controllers 710-1 to 710-7 (hereinafter, referred to as level-4 firmware) from the host 120.

The host 120 may store the level-2 firmware, the level-3 firmware, and the level-4 firmware in the memory 310. According to an implementation, the level-1 controller 410 may receive the level-2 firmware, the level-3 firmware, and the level-4 firmware from the host 120 and store the level-2 firmware, the level-3 firmware, and the level-4 firmware in the memory 310. According to another implementation, the host 120 may transmit the level-2 firmware to the level-2 controllers 510-1 to 510-3, the level-3 firmware to the level-3 controllers 610-1 to 610-5, and the level-4 firmware to the level-4 controllers 710-1 to 710-7.

The level-1 controller 410 may perform a firmware update for one or more of the level-2 controllers 510-1 to 510-3. For example, in FIG. 5, the level-1 controller 410 may verify that a firmware update of the level-2 controller 510-1, among the level-2 controllers 510-1 to 510-3, has not been performed, by referring to the controller status table described above. The level-1 controller 410 may write (or transmit) the level-2 firmware stored in the memory 310 to the level-2 controller 510-1. The level-2 controller 510-1 may boot by performing a reset operation when the level-2 firmware is written thereto, and transmit a response to the level-1 controller 410 upon booting. The level-1 controller 410 or the level-2 controller 510-1 may record the completion of booting of the level-2 controller 510-1 or the completion of the firmware update of the level-2 controller 510-1 in the controller status table.

According to an implementation, the level-1 controller 410 may simultaneously write the level-2 firmware to two or more of the level-2 controllers 510-1 to 510-3 or to all the level-2 controllers 510-1 to 510-3.

Figure 6:
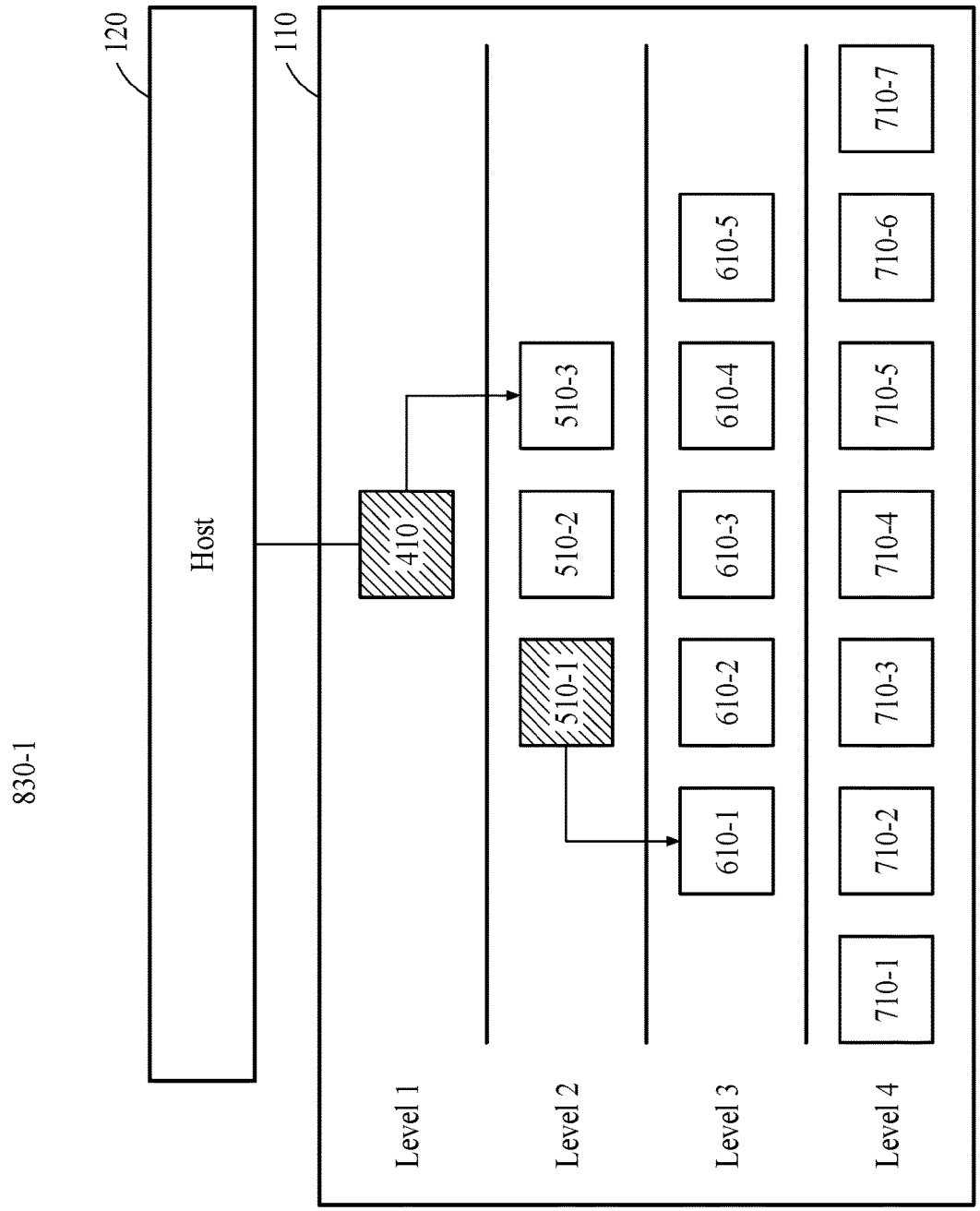

In FIG. 6, the level-1 controller 410 may verify that a firmware update of the level-2 controller 510-3 has not been performed by referring to the controller status table. The level-1 controller 410 may perform a firmware update for the level-2 controller 510-3. For example, the level-1 controller 410 may write the level-2 firmware stored in the memory 310 to the level-2 controller 510-3. The level-2 controller 510-3 may boot by performing a reset operation when the level-2 firmware is written thereto and transmit a response to the level-1 controller 410 upon booting. The level-1 controller 410 or the level-2 controller 510-3 may record the completion of booting of the level-2 controller 510-3 or the completion of the firmware update of the level-2 controller 510-3 in the controller status table.

In addition, in FIG. 6, the level-2 controller 510-1 may verify that a firmware update of the level-3 controller 610-1, having a lower level than the level-2 controller 510-1, has not been performed by referring to the controller status table. As shown in FIG. 6, if there is a same-level controller 510-2 with out-of-date firmware and a lower-level controller 610-1 with out-of-date firmware, the level-2 controller 510-1 may select the lower-level controller 610-1 with out-of-date firmware with higher priority over the same-level controller 510-2 with out-of-date firmware. A firmware is out-of-date if the firmware was not updated when a firmware update was performed. Accordingly, the firmware update for all the controllers may be started quickly.

The level-2 controller 510-1 may perform a firmware update for the level-3 controller 610-1. As an example, the level-2 controller 510-1 may write the level-3 firmware stored in the memory 310 to the level-3 controller 610-1. As another example, the level-2 controller 510-1 may request the level-3 firmware from the level-1 controller 410, receive the level-3 firmware from the level-1 controller 410, and write the level-3 firmware to the level-3 controller 610-1. The level-3 controller 610-1 may boot by performing a reset operation when the level-3 firmware is written thereto, and transmit a response to the level-2 controller 510-1 upon booting. The level-2 controller 510-1 or the level-3 controller 610-1 may record the completion of booting of the level-3 controller 610-1 or the completion of the firmware update of the level-3 controller 610-1 in the controller status table.

Figure 7:
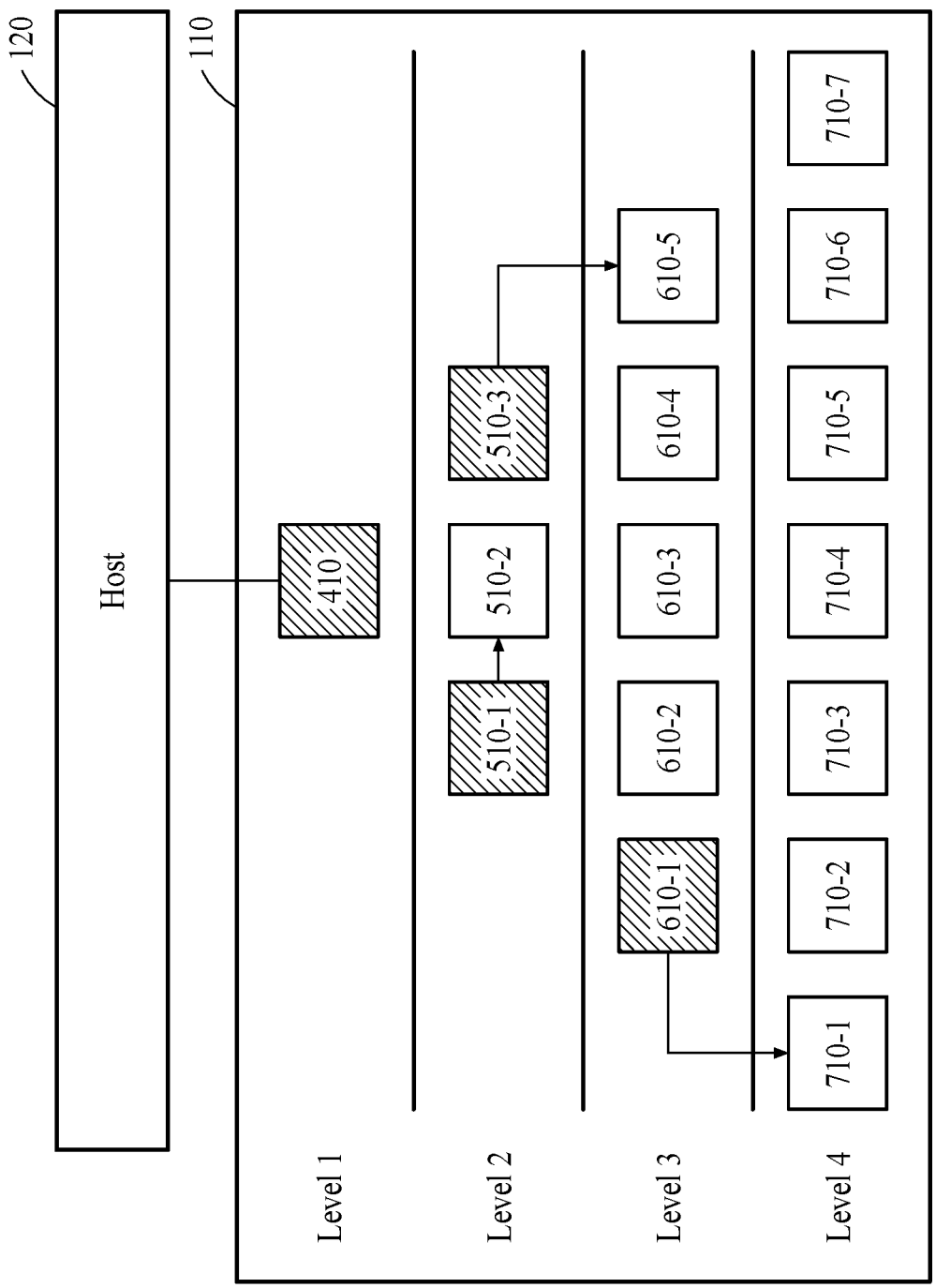

In FIG. 7, the level-2 controller 510-1 may verify that a firmware update of the level-2 controller 510-2 having the same level as the level-2 controller 510-1 has not been performed, by referring to the controller status table. In this case, the level-2 controller 510-1 may perform a firmware update for the level-2 controller 510-2. As an example, the level-2 controller 510-1 may write the level-2 firmware stored in the memory 310 to the level-2 controller 510-2. The level-2 controller 510-2 may boot by performing a reset operation when the level-2 firmware is written thereto, and transmit a response to the level-2 controller 510-1 upon booting. The level-2 controller 510-1 or the level-2 controller 510-2 may record the completion of booting of the level-2 controller 510-2 or the completion of the firmware update of the level-2 controller 510-2 in the controller status table.

In addition, in FIG. 7, the level-2 controller 510-3 may perform a firmware update for the level-3 controller 610-5, and the level-3 controller 610-1 may perform a firmware update for the level-4 controller 710-1. When an upper-level controller writes firmware to a same-level controller or a lower-level controller as described above, the time of firmware update for the controllers 410, 510-1 to 510-3, 610-1 to 610-5, and 710-1 to 710-7 in the electronic device 110 may be reduced.

The above-described examples correspond to performing a firmware update for a same-level controller or a lower-level controller when a predetermined-level controller is booted according to a firmware update. However, examples are not limited thereto. The predetermined-level controller may control a DMA controller to perform a firmware update for the same-level controller or the lower-level controller with out-of-date firmware while being booted according to a firmware update. The predetermined-level controller may perform a firmware update to a controller with out-of-date firmware even when booting is completed, among same-level controllers or lower-level controllers. Accordingly, the firmware of each of the controllers 410, 510-1 to 510-3, 610-1 to 610-5, and 710-1 to 710-7 in the electronic device 110 may be updated more quickly.

For example, in FIG. 6, the level-2 controller 510-1 may transmit a command for a firmware update for the level-3 controller 610-1 to the DMA controller while being booted according to a firmware update. The DMA controller of the level-2 controller 510-1 may read the level-3 firmware from the memory 310 based on the command from the level-2 controller 510-1, and write the level-3 firmware to the level-3 controller 610-1. Accordingly, while the level-2 controller 510-1 is booted, the firmware update for the level-3 controller 610-1 may be performed. Likewise, in FIG. 7, the level-2 controller 510-1 may cause a firmware update for the level-2 controller 510-2 to be performed while being booted, the level-2 controller 510-3 may cause a firmware update for the level-3 controller 610-5 to be performed while being booted, and the level-3 controller 610-1 may cause a firmware update for the level-4 controller 710-1 to be performed while being booted. Accordingly, the firmware update rate may be further improved.

If it is impossible to write firmware (or perform a firmware update) to a predetermined-level controller, if firmware is written to a predetermined-level controller, but there is no response to the completion of booting, or if a status indicating the completion of booting (or the completion of a firmware update) of a predetermined-level controller is not recorded in a controller status table within a predetermined time, it may be determined the predetermined-level controller is abnormal.

In FIG. 7, the level-2 controller 510-3 may determine that the level-3 controller 610-5 is abnormal in response to failing to write the level-3 firmware to (or perform an update for) the level-3 controller 610-5, or in response to there being no response to the completion of booting of the level-3 controller 610-5 although the level-3 firmware is written to (or updated for) the level-3 controller 610-5. Based on this determination, the level-2 controller 510-3 may record the abnormality of the level-3 controller 610-5 in the controller status table. As another example, a status indicating the completion of booting (or the completion of a firmware update) of the level-3 controller 610-5 may not be recorded in the controller status table within a predetermined time. In this case, the level-1 controller 410 or the host 120 may determine that the level-3 controller 610-5 is abnormal.

Figure 8:
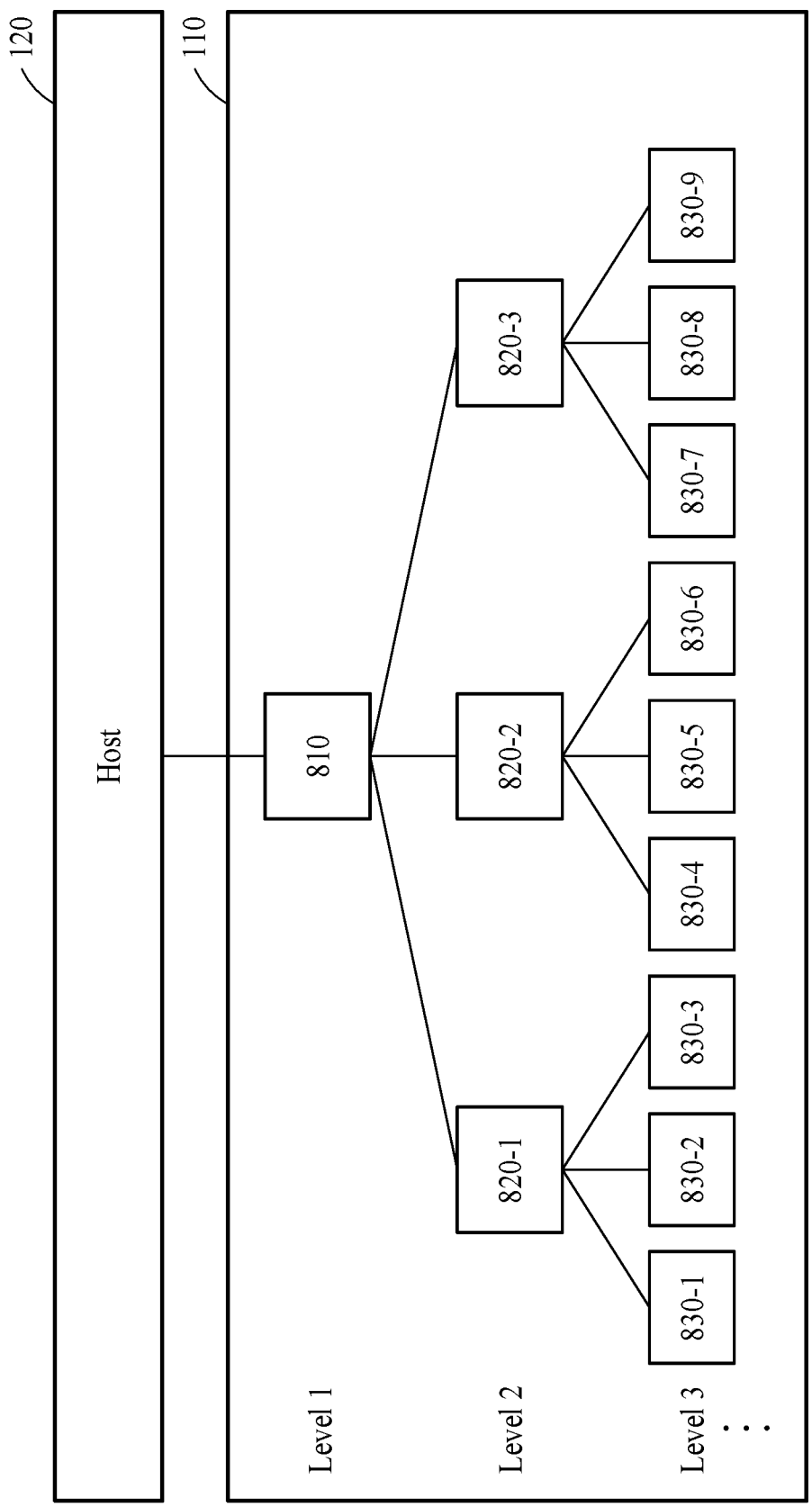
FIG. 8 illustrates an example of a broadcasting-based firmware update in an electronic device.

FIG. 8 illustrates an example of a broadcasting-based firmware update in an electronic device.

In FIG. 8, the electronic device 110 may include a level-1 controller 810, level-2 controllers 820-1 to 830-3, and level-3 controllers 830-1 to 830-9.

In FIG. 8, the same-level controllers may write firmware using data broadcast from an upper-level controller. The level-1 controller 810 may receive firmware (hereinafter, level-2 firmware) of the level-2 controllers 820-1 to 830-3 and firmware (hereinafter, level-3 firmware) of the level-3 controllers 830-1 to 830-9 from the host 120, and store the level-2 firmware and the level-3 firmware in the memory 310. According to an implementation, the host 120 may store the level-2 firmware and the level-3 firmware in the memory 310.

The level-1 controller 810 may write the level-2 firmware to or perform an update for the level-2 controllers 820-1 to 830-3. In addition, each of the level-2 controllers 820-1 to 830-3 may write the level-3 firmware to or perform an update for the level-3 controllers connected thereto. In detail, the level-2 controller 820-1 may write the level-3 firmware to or perform an update for each of the level-3 controllers 830-1 to 830-3, the level-2 controller 820-2 may write the level-3 firmware to or perform an update for each of the level-3 controllers 830-4 to 830-6, and the level-2 controller 820-3 may write the level-3 firmware to or perform an update for each of the level-3 controllers 830-7 to 830-9.

The diffusion-based firmware update or broadcasting-based firmware update described above may apply to controllers that form various structures or topologies (for example, in the shape of a tree, tree-ring, mesh, torus, ring, star, or ring-star).

Figure 9:
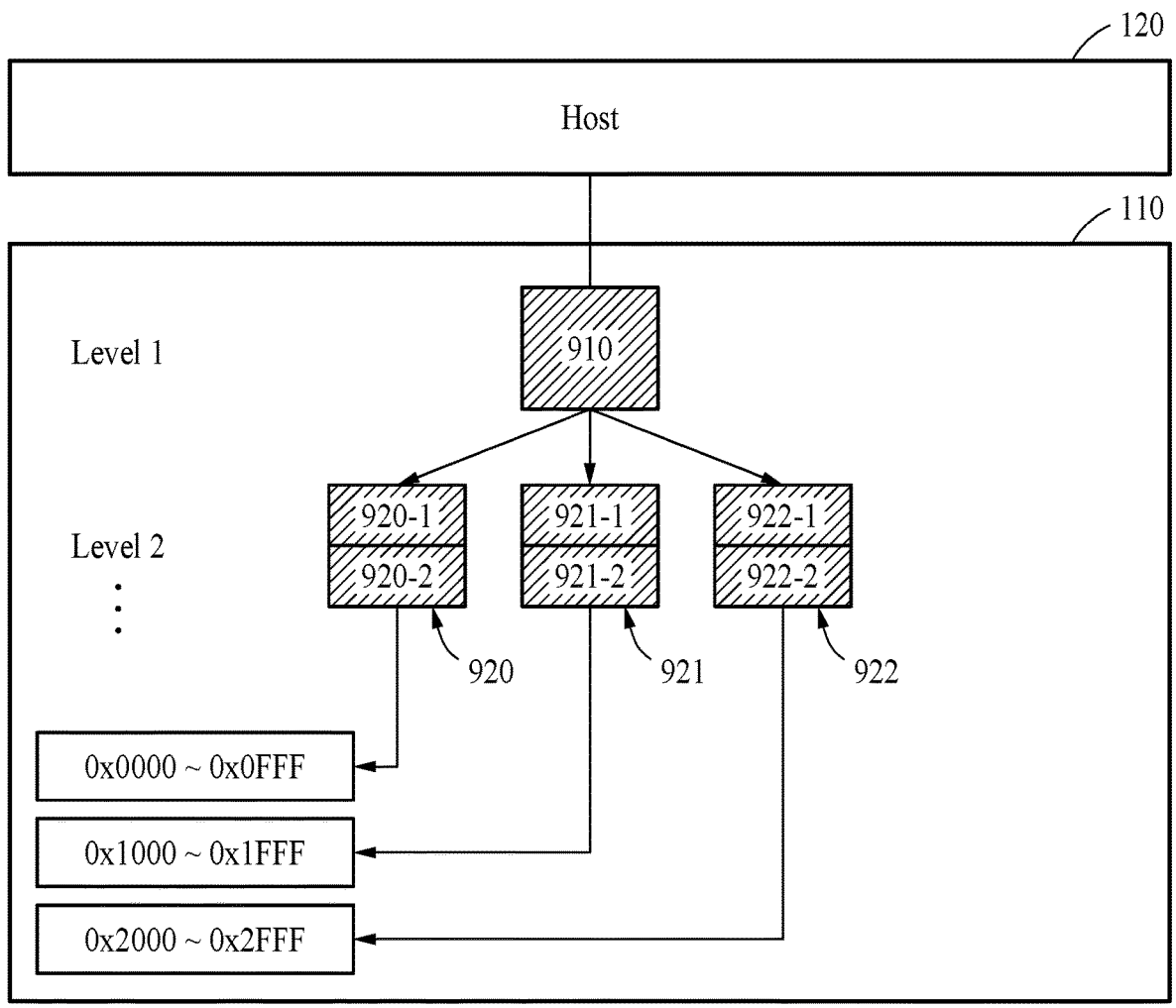
FIGS. 9 and 10 illustrate examples of allocating a memory address to a lower-level controller by an upper-level controller in an electronic device.
Figure 10:
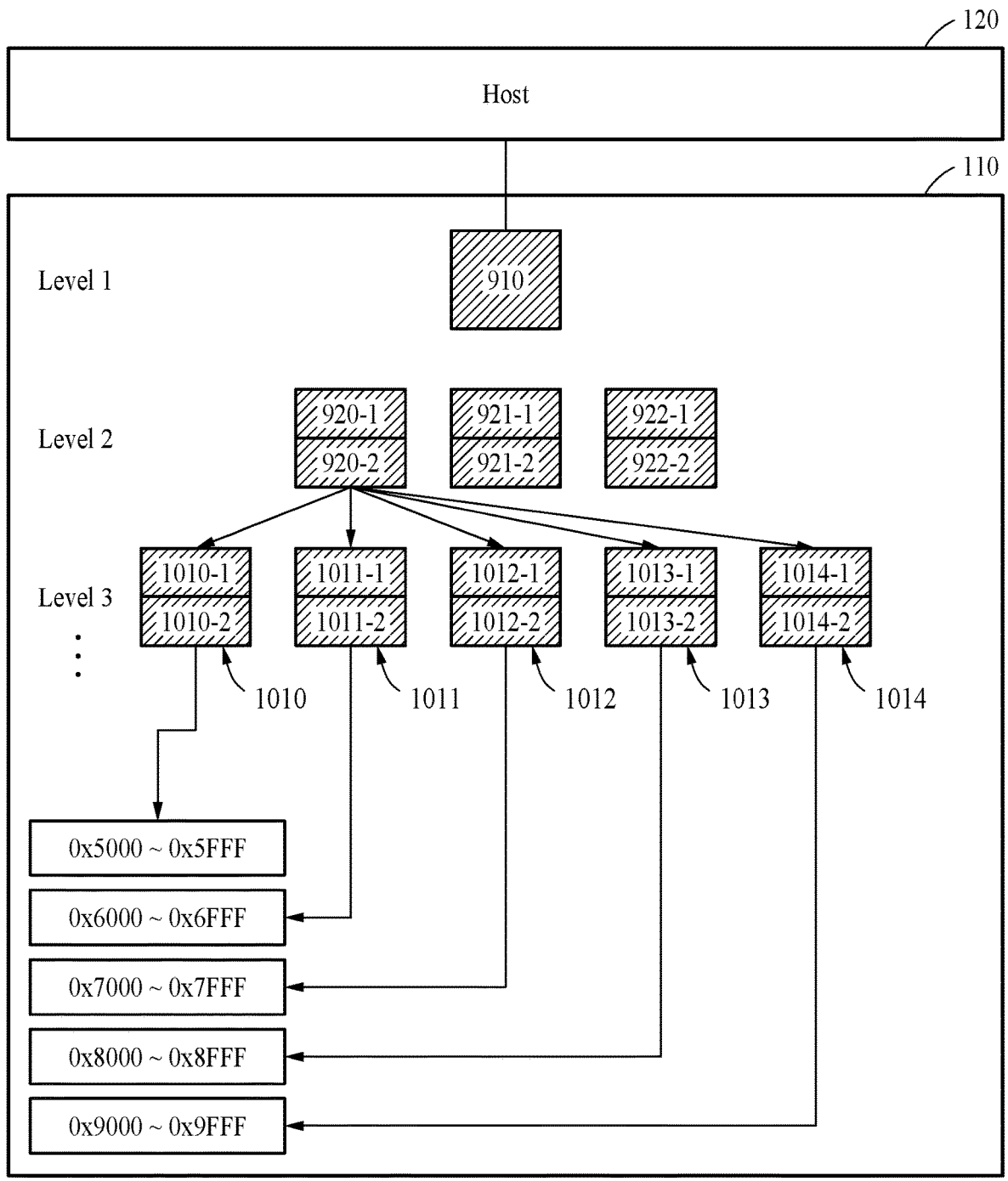

FIGS. 9 and 10 illustrate examples of allocating a memory address to a lower-level controller by an upper-level controller in an electronic device.

Same-level controllers may share a memory area. In this case, a binary for memory mapping may be distinguished from a binary for executing a command. In other words, a portion mapped to a memory address of each of the same-level controllers sharing a memory area may be variable, and a portion corresponding to the same command of the same-level controllers may be fixed.

In FIG. 9, a level-1 controller 910 may perform the diffusion-based firmware update or broadcasting-based firmware update described above to level-2 controllers 920 to 922.

The level-2 controllers 920 to 922 may share a memory area. In this case, the level-2 controllers 920 to 922 may include fixed portions 920-1, 921-1, and 922-1 and variable portions 920-2, 921-2, and 922-2 that are distinguished from each other.

The level-1 controller 910 may designate a memory area to the variable portion 920-2 of the level-2 controller 920. For example, the level-1 controller 910 may map memory addresses "0x0000 to 0x0FFF" to the variable portion 920-2 of the level-2 controller 920. In other words, the level-1 controller 910 may allocate the memory addresses "0x0000 to 0x0FFF" to the level-2 controller 920. The level-1 controller 910 may designate a memory area to the variable portion 921-2 of the level-2 controller 921, and designate a memory area to the variable portion 922-2 of the level-2 controller 922. For example, the level-1 controller 910 may allocate memory addresses "0x1000 to 0x1FFF" to the level-2 controller 921, and allocate memory addresses "0x2000 to 0x2FFF" to the level-2 controller 922.

In the example of FIG. 10, level-3 controllers 1010 to 1014 may share a memory area. Like the example of FIG. 9, the level-2 controller 920 may allocate memory addresses to each of the level-3 controllers 1010 to 1014.

Figure 11:
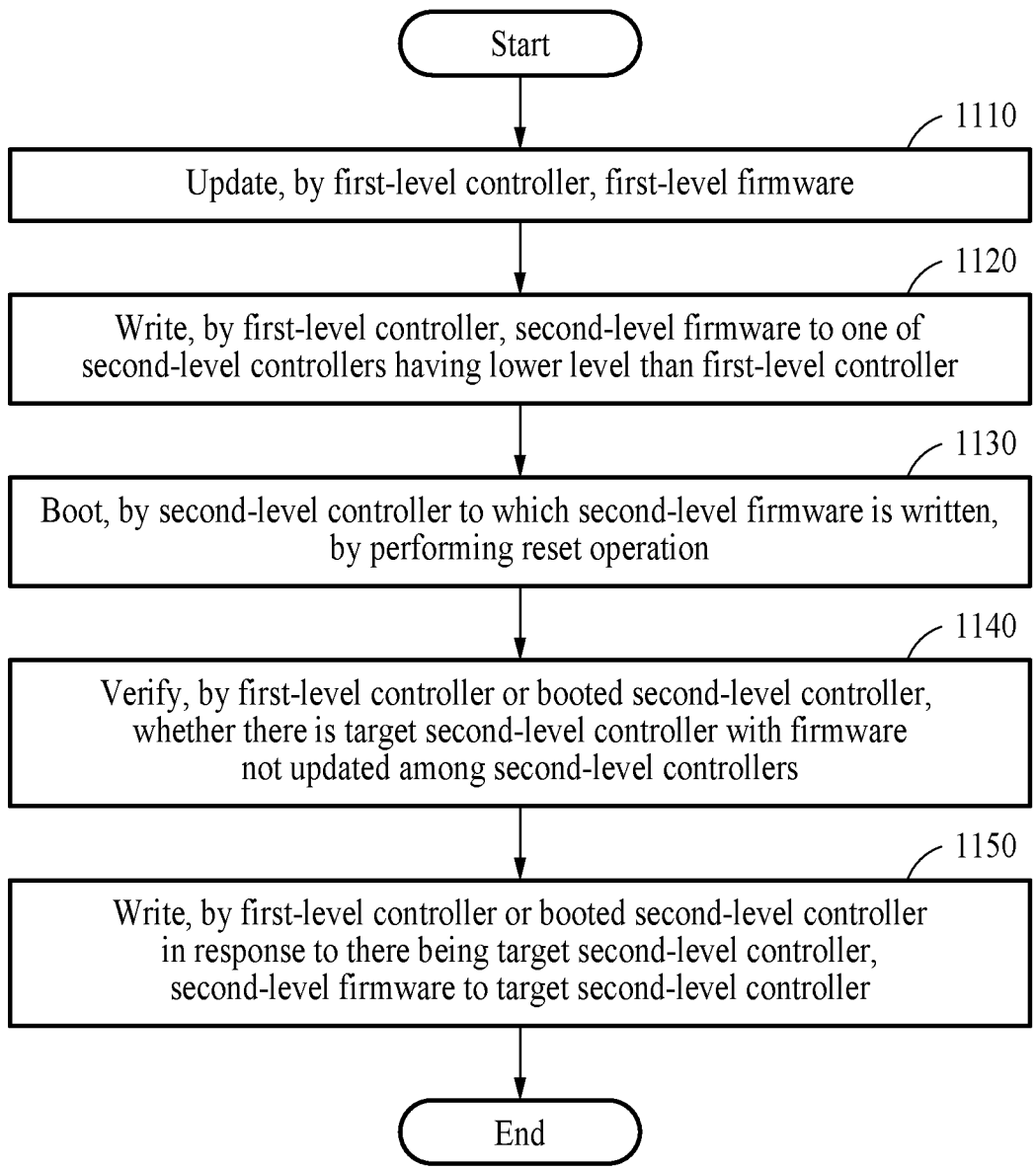
FIG. 11 illustrates an example of an operating method of an electronic device.

FIG. 11 illustrates an example of an operating method of an electronic device.

A first-level controller described with reference to FIG. 11 is the highest-level controller, and may correspond to the level-1 controller described above. Further, second-level controllers described with reference to FIG. 11 are controllers having the second-highest level, and may correspond to the level-2 controllers described above. In addition, third-level controllers described with reference to FIG. 11 are controllers having the third-highest level, and may correspond to the level-3 controllers described above.

In FIG. 11, in operation 1110, the first-level controller in the electronic device 110 updates first-level firmware. Here, the first-level firmware is firmware of the first-level controller. In operation 1110, the first-level controller may request an updated version of the first-level firmware from the host 210 and receive the updated version from the host 210.

When booted by updating the first-level firmware, the first-level controller may request a second-level firmware and third-level firmware from the host 120. Here, the second-level firmware is firmware of the second-level controllers, and the third-level firmware is firmware of the third-level controllers. The first-level controller may receive the second-level firmware and the third-level firmware from the host 120 and store the second-level firmware and the third-level firmware in the memory 310.

In operation 1120, the first-level controller writes the second-level firmware to one of the second-level controllers having a lower level than the first-level controller. In operation 1120, the first-level controller may write the second-level firmware stored in the memory 310 to one of the second-level controllers.

In operation 1130, the second-level controller to which the second-level firmware is written boots by performing a reset operation.

In operation 1140, the first-level controller or the booted second-level controller verifies whether there is a target second-level controller with out-of-date firmware. In operation 1140, the first-level controller or the booted second-level controller may verify whether there is a target second-level controller among the second-level controllers by referring to the controller status table described above.

In operation 1150, the first-level controller or the booted second-level controller writes, in response to there being a target second-level controller, the second-level firmware to the target second-level controller. In other words, the firmware update for the target second-level controller may be performed by a same-level controller or an upper-level controller.

The booted second-level controller may verify whether there is a target third-level controller with out-of-date firmware among the third-level controllers having a lower level than the second-level controllers by referring to the controller status table described above. The booted second-level controller may write, in response to there being a target third-level controller, the third-level firmware stored in the memory 310 to the target third-level controller. According to an implementation, the booted second-level controller may request the third-level firmware from the first-level controller, receive the third-level firmware from the first-level controller, and write the third-level firmware to the target third-level controller.

The first-level controller or the booted second-level controller may determine, in response to failing to write the second-level firmware to the target second-level controller or in response to there being no response to the completion of booting of the target second-level controller although the second-level firmware is written to the target second-level controller, that the target second-level controller is abnormal. Alternately, the first-level controller may determine, in response to a status for indicating the completion of booting (or the completion of a firmware update) of the target second-level controller being not written to the controller status table within a predetermined time, that the target second-level controller is abnormal.

The description provided with reference to FIGS. 1 through 10 also applies to the description of FIG. 11, and thus a detailed description will be omitted for conciseness.

Figure 12:
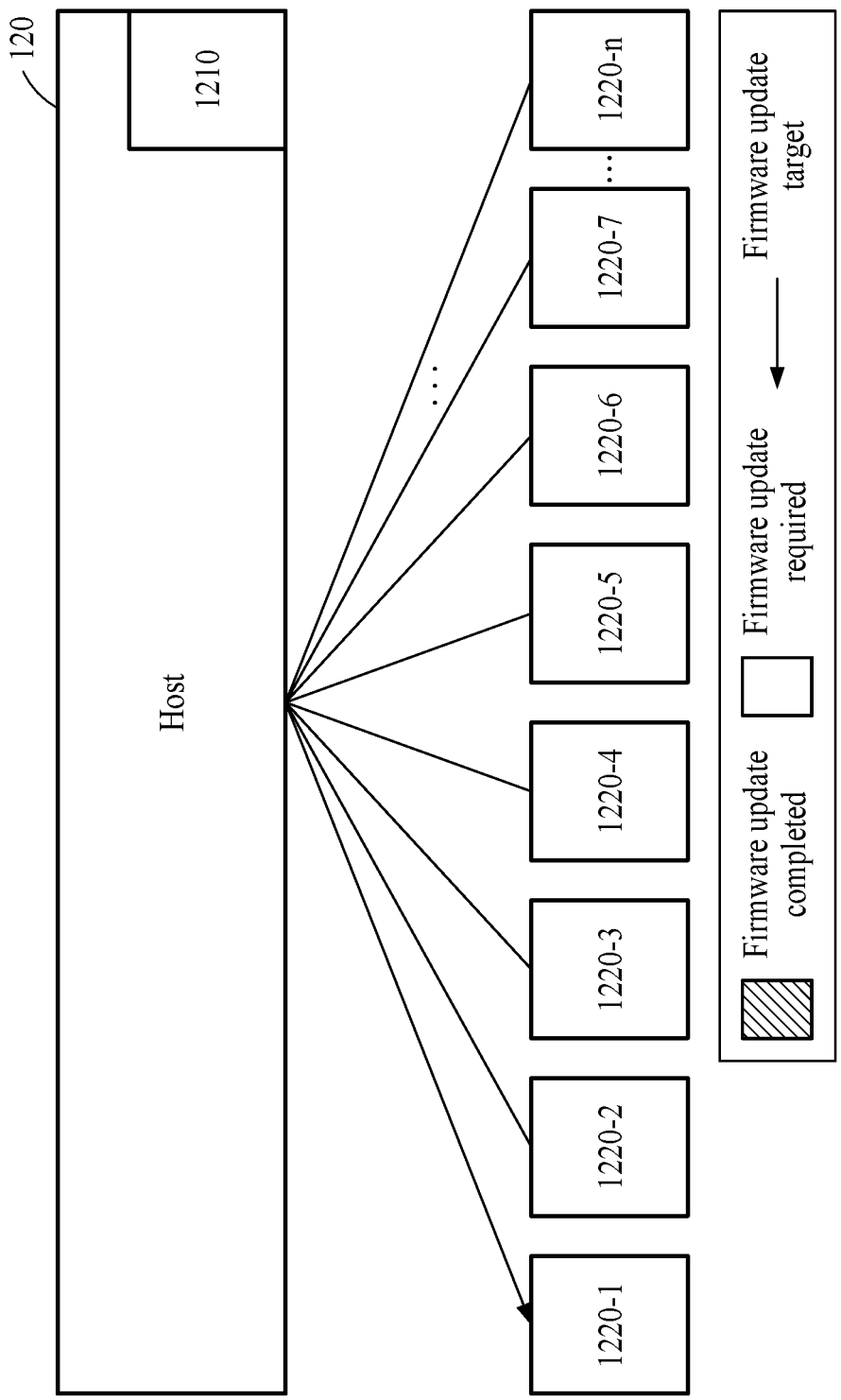
FIGS. 12 to 14 illustrate an example of a firmware update of electronic devices.
Figure 13:
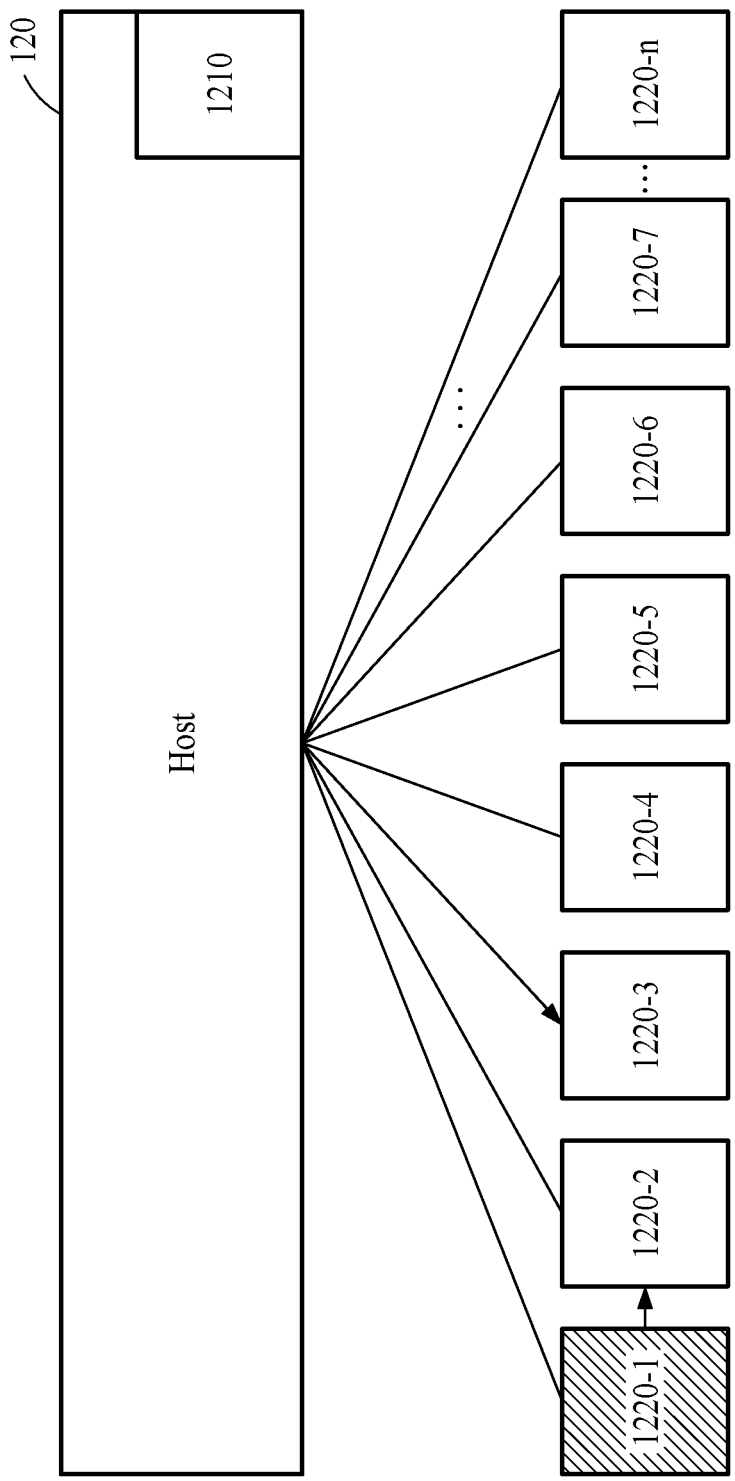
Figure 14:
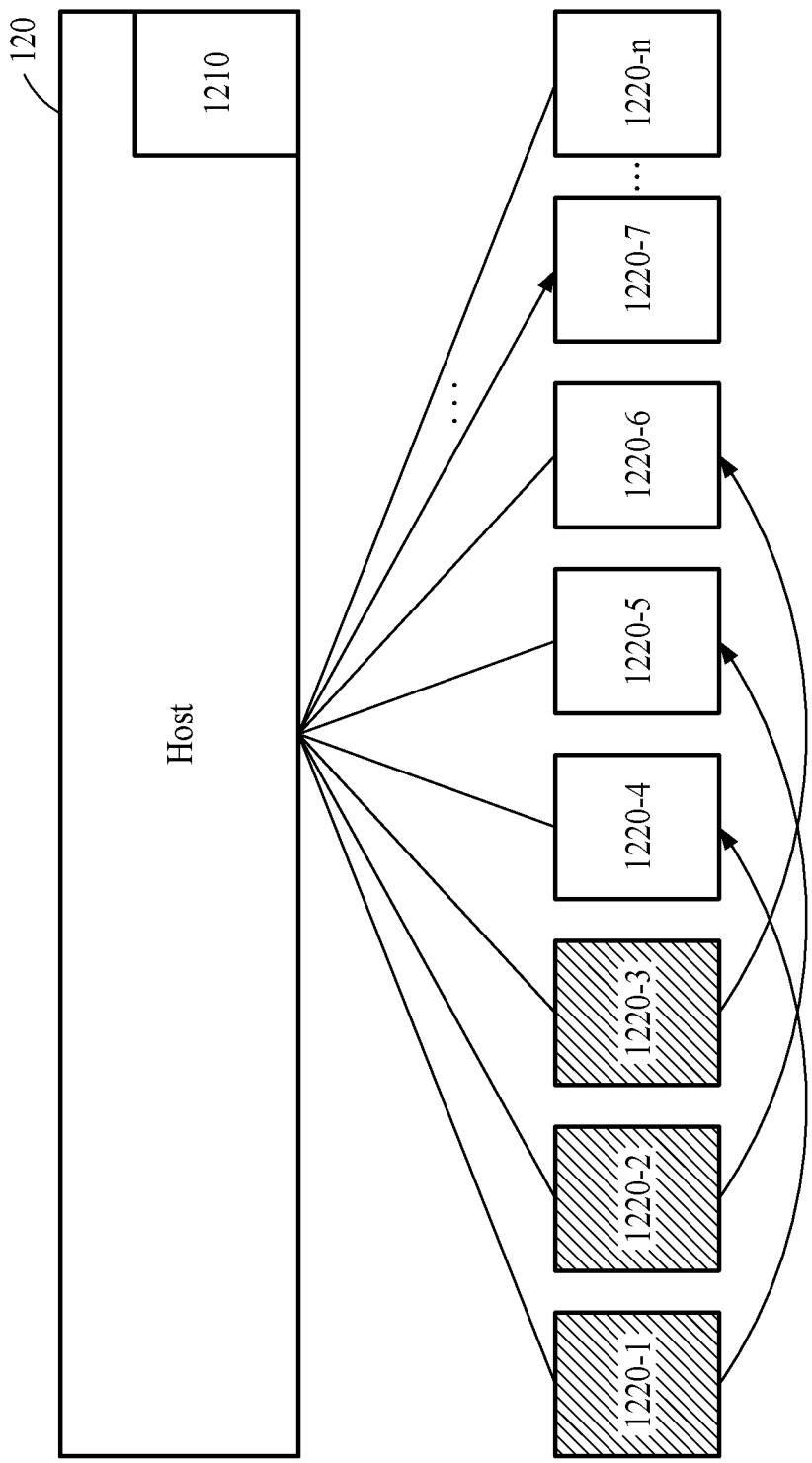

FIGS. 12 to 14 illustrate an example of a firmware update of electronic devices.

In FIG. 12, a network system includes electronic devices 1220-1 to 1220-$n$ and a host 120.

Each of the electronic devices 1220-1 to 1220-$n$ communicates with the host 120. Each of the electronic devices 1220-1 to 1220-$n$ may be included in an electronic device such as, for example, a smart phone, a laptop computer, a PC, a tablet, a drone, or an IoT device. However, examples are not limited thereto. In an example, each of the electronic devices 1220-1 to 1220-$n$ may correspond to the electronic device 110 described above. However, examples are not limited thereto.

A device status table 1210 may be stored in the host 120. Whether a firmware update of each of the electronic devices 1220-1 to 1220-$n$ has been completed may be recorded in the device status table 1210.

In FIG. 12, the electronic device 1220-1 may request firmware from the host 120, and receive the firmware from the host 120 to perform a firmware update. When the firmware update is completed, the electronic device 1220-1 may transmit a response to the host 120. When the firmware update of the electronic device 1220-1 is completed, the electronic device 1220-1 or the host 120 may record, in the device status table 1210, a status indicating that the firmware update of the electronic device 1220-1 has been completed.

In FIG. 13, the electronic device 1220-1 may perform a firmware update for the electronic device 1220-2. Like a predetermined-level controller performing a firmware update for a same-level controller or a lower-level controller as described above, the electronic device 1220-1 may perform a firmware update for the electronic device 1220-2. In other words, the electronic device 1220-1 for which the firmware update has been completed may write firmware to the electronic device 1220-2 with out-of-date firmware. When the firmware update is completed, the electronic device 1220-2 may transmit a response to the electronic device 1220-1. The electronic device 1220-1 or the electronic device 1220-2 may record a status indicating that the firmware update of the electronic device 1220-2 has been completed in the device status table 1210.

In addition, in FIG. 13, the electronic device 1220-3 may receive firmware from the host 120 and perform a firmware update. When the firmware update is completed, the electronic device 1220-3 may transmit a response to the host 120. When the firmware update of the electronic device 1220-3 is completed, the electronic device 1220-3 or the host 120 may record, in the device status table 1210, a status indicating that the firmware update of the electronic device 1220-3 has been completed.

In FIG. 14, the electronic device 1220-1 may perform a firmware update for the electronic device 1220-4, the electronic device 1220-2 may perform a firmware update for the electronic device 1220-5, and the electronic device 1220-3 may perform a firmware update for the electronic device 1220-6. The electronic device 1220-7 may receive firmware from the host 120 and perform a firmware update.

As described with reference to FIGS. 12 to 14, a portion of the electronic devices on a network may receive firmware from the host 120 and perform a firmware update, and an electronic device for which a firmware update has been completed may perform a firmware update for an electronic device with out-of-date firmware. Accordingly, the firmware update of each of the electronic devices 1220-1 to 1220-$n$ in the network may be performed quickly.

The firmware update of the electronic devices 1221-1 to 1220-$n$ may be performed similarly to the diffusion-based firmware update or broadcasting-based firmware update. In addition, the electronic devices 1220-1 to 1220-$n$ may form a network topology. The network topology may include a tree structure, a tree-ring structure, a mesh structure, a torus structure, a ring structure, a star structure, or a ring-star structure.

The description provided with reference to FIGS. 1 through 11 may also apply to the description of FIGS. 12 to 14, and thus a detailed description will be omitted for conciseness.

The electronic device 110, electronic devices 1220-1 to 1220-$n$, NPU 200, controller 210, memory 220, I/O (DMA) 230, memory 310, and host 120 in FIGS. 1-14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method of an electronic device including controllers, the operating method comprising:
    updating, by a first-level controller of the controllers, a first-level firmware of the first-level controller;
    writing, by the first-level controller, a second-level firmware to one of second-level controllers of the controllers having a lower level than the first-level controller;
    booting, by the one of the second-level controllers, by performing a reset operation;
    verifying, by the first-level controller or the booted second-level controller, whether there is a target second-level controller with out-of-date firmware; and
    in response to a result of the verifying of whether there is the target second-level controller being that there is the target second-level controller, performing, by the first-level controller or the booted second-level controller, a firmware update on the target second-level controller by writing the second-level firmware to the target second-level controller.

2. The operating method of claim 1, wherein the writing of, by the first-level controller, the second-level firmware to the one of the second-level controllers comprises writing, by the first-level controller, the second-level firmware stored in an external memory to the one of the second-level controllers.

3. The operating method of claim 1, further comprising:
    verifying, by the booted second-level controller, whether there is a target third-level controller with out-of-date firmware among third-level controllers of the controllers having a lower level than the second-level controllers;
    requesting, by the booted second-level controller in response to there being the target third-level controller with out-of-date firmware, third-level firmware from the first-level controller; and
    receiving, by the booted second-level controller, the third-level firmware from the first-level controller and writing the third-level firmware to the target third-level controller.

4. The operating method of claim 1, further comprising:
    verifying, by the booted second-level controller, whether there is a target third-level controller with out-of-date firmware among third-level controllers of the controllers having a lower level than the second-level controllers; and
    writing, by the booted second-level controller in response to there being a target third-level controller with out-of-date firmware, third-level firmware stored in an external memory to the target third-level controller.

5. The operating method of claim 1, further comprising:
    controlling, by the target second-level controller while being booted after the second-level firmware is written thereto, a direct memory access (DMA) controller to perform a firmware update for a same-level or lower-level controller with out-of-date firmware.

6. The operating method of claim 1, further comprising:
    requesting, by the first-level controller in response to being booted by updating the first-level firmware, the second-level firmware from a host; and
    receiving, by the first-level controller, the second-level firmware from the host and storing the second-level firmware in a memory.

7. The operating method of claim 1, further comprising:
    determining, by the first-level controller or the booted second-level controller in response to failing to write the second-level firmware to the target second-level controller or unacknowledged completion of booting of the target second-level controller after the writing to the target second-level controller, that the target second-level controller is abnormal.

8. The operating method of claim 1, further comprising:
    determining, by the first-level controller in response to acknowledged completion of booting of the target second-level controller unwritten to a controller status table within a predetermined time, that the target second-level controller is abnormal.

9. The operating method of claim 1, wherein the writing of, by the first-level controller, the second-level firmware to the one of the second-level controllers comprises writing, by the first-level controller, the second-level firmware to the second-level controllers in a broadcasting-based manner, and wherein the operating method further comprises:
writing, by the booted second-level controller, a third-level firmware to third-level controllers of the controllers connected to the booted second-level controller in the broadcasting-based manner.

10. The operating method of claim 1, further comprising:
allocating, by the first-level controller, a memory address to each of the second-level controllers.

11. An electronic device, comprising:
controllers comprising:
a first-level controller configured to update a first-level firmware, and write a second-level firmware to one of second-level controllers having a lower level than the first-level controller, wherein
the one of the second-level controllers is configured to boot by performing a reset operation,
the first-level controller or the booted second-level controller is configured to verify whether there is a target second-level controller with out-of-date firmware, and
the first-level controller or the booted second-level controller is configured to, in response to a result of the verifying of whether there is the target second-level controller being that there is the target second-level controller, perform a firmware update on the target second-level controller by writing, the second-level firmware to the target second-level controller.

12. The electronic device of claim 11, wherein the booted second-level controller is configured to
verify whether there is a target third-level controller with out-of-date firmware among third-level controllers of the controllers having a lower level than the second-level controllers,
request, in response to there being a target third-level controller with out-of-date firmware, a third-level firmware from the first-level controller, and
receive the third-level firmware from the first-level controller and write the third-level firmware to the target third-level controller.

13. The electronic device of claim 11, wherein the booted second-level controller is configured to
verify whether there is a target third-level controller with out-of-date firmware among third-level controllers of the controllers having a lower level than the second-level controllers, and
write, in response to there being a target third-level controller with out-of-date firmware, a third-level firmware stored in a memory to the target third-level controller.

14. The electronic device of claim 11, wherein the target second-level controller is configured to control, while being booted after the second-level firmware is written thereto, a direct memory access (DMA) controller to perform a firmware update for a same-level or lower-level controller with out-of-date firmware.

15. The electronic device of claim 11, wherein the first-level controller or the booted second-level controller is configured to
determine, in response to failing to write the second-level firmware to the target second-level controller or unacknowledged completion of booting of the target second-level controller after the writing to the target second-level controller, that the target second-level controller is abnormal, or
determine, in response to acknowledged completion of booting of the target second-level controller unwritten to a controller status table within a predetermined time, that the target second-level controller is abnormal.

16. The electronic device of claim 11, wherein the first-level controller is further configured to write the second-level firmware to the second-level controllers in a broadcasting-based manner,
the booted second-level controller is configured to write a third-level firmware to third-level controllers of the controllers connected to the booted second-level controller in the broadcasting-based manner, and
the third-level controllers have a lower level than the booted second-level controller, and the third-level firmware is of the third-level controllers.

17. A network system, comprising:
electronic devices; and
a host configured to communicate with the electronic devices, the electronic devices comprising a first electronic device configured to receive firmware from the host and perform a firmware update, wherein
each of the first electronic device and the host is configured to perform a firmware update by writing the firmware respectively to other electronic devices with out-of-date firmware, and
each of the first electronic device, the firmware-updated electronic devices, and the host is configured to perform a firmware update by writing the firmware respectively to other electronic devices with out-of-date firmware.

18. The network system of claim 17, wherein the host is configured to store a device status table comprising firmware update status for each of the electronic devices.

19. The network system of claim 17, wherein the electronic devices form a network topology.

20. The network system of claim 19, wherein the network topology comprises a tree structure, a tree-ring structure, a mesh structure, a torus structure, a ring structure, a star structure, or a ring-star structure.

* * * * *